Sept. 15, 1942.   W. L. MAXSON ET AL   2,295,998
VARIABLE RATIO GEARING
Filed Dec. 26, 1940   11 Sheets-Sheet 1

INVENTOR.
WILLIAM L. MAXSON and
PETER J. MCLAREN
BY

Sept. 15, 1942.  W. L. MAXSON ET AL  2,295,998
VARIABLE RATIO GEARING
Filed Dec. 26, 1940    11 Sheets-Sheet 2

$$r = \frac{kd\sin x}{kd(Kx-\sin x)} = \frac{\cos x}{K-\cos x}$$

$$r = \frac{kd(y-y_0)}{kd[k_1 x + K(y-y_0)]} = \frac{dy}{k_1 dx + K dy}$$

$$r = \frac{kd[Kx-(y-y_0)]}{kdx} = K - \frac{dy}{dx}$$

INVENTOR.
WILLIAM L. MAXSON
and PETER J. MCLAREN
BY
ATTORNEYS

Sept. 15, 1942.  W. L. MAXSON ET AL  2,295,998
VARIABLE RATIO GEARING
Filed Dec. 26, 1940   11 Sheets-Sheet 3

$$r = \frac{kd[Kx-(y-y_0)]}{kd[x+k_1(y-y_0)]} = \frac{Kdx-dy}{dx+k_1\,dy}$$

$$r = \frac{kk_2\,d[k_1x+(K-1)(y-y_0)]}{kd[k_1x+K(y-y_0)]} = \frac{k_2[k_1\,dx+(K-1)dy]}{k_1\,dx+Kdy}$$

INVENTOR.
WILLIAM L. MAXSON
and PETER J. McLAREN
BY
ATTORNEYS

Sept. 15, 1942.  W. L. MAXSON ET AL  2,295,998
VARIABLE RATIO GEARING
Filed Dec. 26, 1940   11 Sheets-Sheet 10

INVENTOR.
WILLIAM L. MAXSON
and PETER J. MCLAREN
BY

Sept. 15, 1942.   W. L. MAXSON ET AL   2,295,998
VARIABLE RATIO GEARING
Filed Dec. 26, 1940   11 Sheets-Sheet 11

INVENTOR.
WILLIAM L. MAXSON
and PETER J. MCLAREN
BY

Patented Sept. 15, 1942

2,295,998

UNITED STATES PATENT OFFICE 2,295,998

VARIABLE RATIO GEARING

William L. Maxson, West Orange, N. J., and Peter J. McLaren, New York, N. Y., assignors, by mesne assignments, to Reconstruction Finance Corporation, New York, N. Y., a corporation of the United States of America Application December 26, 1940, Serial No. 371,740

12 Claims. (Cl. 74—1)

This invention relates to mathematical apparatus for continuously securing from a variable input a prescribed output which is dependent in value upon the value of the input, but which bears a predetermined, non-linear relation to the input. The present application is a continuation in part of the pending application of William L Maxson and Peter J. McLaren, Ser. No. 113,572, filed December 1, 1936, for Mathematical apparatus.

It is an object of the invention to provide a variable ratio, spiral cam gear, associated input gearing, and output gearing including a follower gear cooperative with spirally arranged teeth of the cam gear, for directly securing from an angular input an output which is constantly proportional to either the sine or the versed sine of the basic input angle. Such gearing has the significant and striking advantage that an extensive input may be uninterruptedly applied without reduction to the spiral gear and that an extensive output may be uninterruptedly secured from such input without the necessity for substantially multiplication, notwithstanding the fact that the entire structure may be of extremely limited size and weight.

It is an important object to provide a variable ratio gear of practical construction which may, at one point in its operation, produce a zero rate of output from a finite input.

It is characteristic of variable ratio gearing of the kind referred to that the instantaneous, effective radius of the spiral track is constantly proportional to the ratio of the rate of output to the rate of input. Since the law which governs the relationship of total output operation to total input operation is always known for any given case and may be expressed in the form of a mathematical equation, it is a simple matter to derive the related equation which governs the length of the effective radius, and to work out the proper effective radius for each tooth of the spiral gear.

If the follower gear axis were arranged to extend radially of the spiral gear and the tooth radius for each tooth of the spiral gear were simply calculated on the basis of the first differential of the output with relation to input, structural difficulties would be encountered, particularly with reference to the innermost teeth of the spiral. It is an important object of the invention to eliminate these difficulties.

To this end the axis of the follower gear is offset with relation to the axis of the spiral gear to miss intersecting relation with the axis of the spiral gear by a predetermined amount. The radius of each spiral gear tooth is desirably so chosen that when that tooth is in engagement with the follower gear and directly beneath the follower gear axis, its effective radius will be proportional to the first differential of the output with relation to the input; in other words, the projection of the true radius of the tooth at the instant referred to, upon a radius of the spiral gear which extends parallel to the axis of the follower gear will be proportional to the first differential of the output with relation to the input. With such an arrangement, the total input, the total output, and the effective radius are in exact harmony with one another under the mathematical formulas governing the construction of the gear, each time that the center of a spiral gear tooth comes directly under the axis of the follower gear.

In the case of a gear for continuously deriving as an output a fixed multiple of the sine of a basic angle which varies between 0° and 90°, from an angular input which is the same fixed multiple of the basic angle, it is feasible to provide a practical structure employing a five-turn spiral of moderate maximum tooth radius. If the maximum tooth radius is prescribed, there is a definite limit to the number of turns that can be put into the spiral.

For the purpose of the present explanation of further objects of the invention it may be assumed that an arbitrary limit is placed upon the maximum tooth radius, such that not more than five turns can be put into the spiral of the sine gear. In such a case the gear input can be twenty times, but not more than twenty times, the basic angle, and the gear output can be twenty times, but not more than twenty times, the sine of the basic angle. The number of turns is limited by the fact that the follower or output gear and its guide finger must be able to pass between the turns of the spiral at the point where adjacent turns lie nearest to one another; in other words, where the change of radius is least for one full turn of the spiral.

In a five-turn sine gear the turns are unevenly spaced, the minimum spacing between the two outermost turns being less than one-sixth of the spacing between the two innermost turns, and less than one-twentieth of the maximum tooth radius.

It is a further object of the present invention to improve such variable ratio gearing for securing angular functions, so that results of the kind mentioned may be produced in a more practical and advantageous manner than by the direct input-output method referred to.

It is a still further object of the present invention to provide improved mechanism capable of practically extending the scope and application of the principle of such conversion gearing to new fields.

It is a salient feature of the present invention that the angular input is combined with a linear function of the functional output and/or the functional output is combined with a linear function of the angular input, thereby enabling the input-output law of the gear to be altered in such manner as to bring about a more even spacing of the spiral turns. By thus modifying the law of variation of the gear, the gear may be designed to include an increased number of turns without increasing the maximum tooth radius and without reducing the minimum spacing of turns.

As previously noted, it is also an object practically to extend the application of the principle of spiral conversion gearing to new fields of usefulness.

In some cases, for example, it is practically desirable to utilize an input-output law of such character that if the input were not modified by the output and/or the output by the input independently of the spiral gear, practically all of the gear area would be devoted to a single turn and the remaining turns would be crowded prohibitively close to one another. Such a situation would occur, for example, if the output and input (within limits) were connected by some such reciprocal law as $$y = \frac{1}{5-x}$$

By virtue of the same principle of input-output modification referred to in connection with the sine gear, it is possible to produce a spiral gear of practical size and of practical turn spacing for securing the desired result.

For the purpose of each illustrative example of this feature of the invention as hereinafter given, it will be arbitrarily assumed that it is not permissible to alter the maximum tooth radius of the gear, and that the minimum permissible turn spacing is one-twentieth of that radius. The problem in each case is then reduced to the question of how many turns a spiral gear of that size and subject to that limitation may be designed to have, and what practical advantage is secured with reference to the primary input and the primary output by reason of the employment of the new gear and the new modification mechanism combined with it.

The advantage secured by modifying the output and/or the input so as to make available a modified input-output law can generally be ascertained by comparing the number of available turns under the unmodified law with the number of available turns under the modified law.

In the case of the five-turn spiral sine gear, for example, of maximum tooth radius R, the basic angle which varies between 0° and 90° is multiplied by 20, and the sine output is correspondingly multiplied by 20, that is, it is constantly equal to twenty times the value of the sine of the basic angle when the radius R is taken equal to 1, or it is equal to the sine if 20R is taken as equal to 1. If a gear of the same size can be caused to produce a total output equal to 28R, the same practical advantage with respect to the nature of the output will have been gained as if the gear had been increased in radius by 40%, and in area by 96%, notwithstanding the fact that the gear is of the same size as before.

Other objects and advantages will hereinafter appear.

In the drawings which form a part of this specification:

Figure 1:
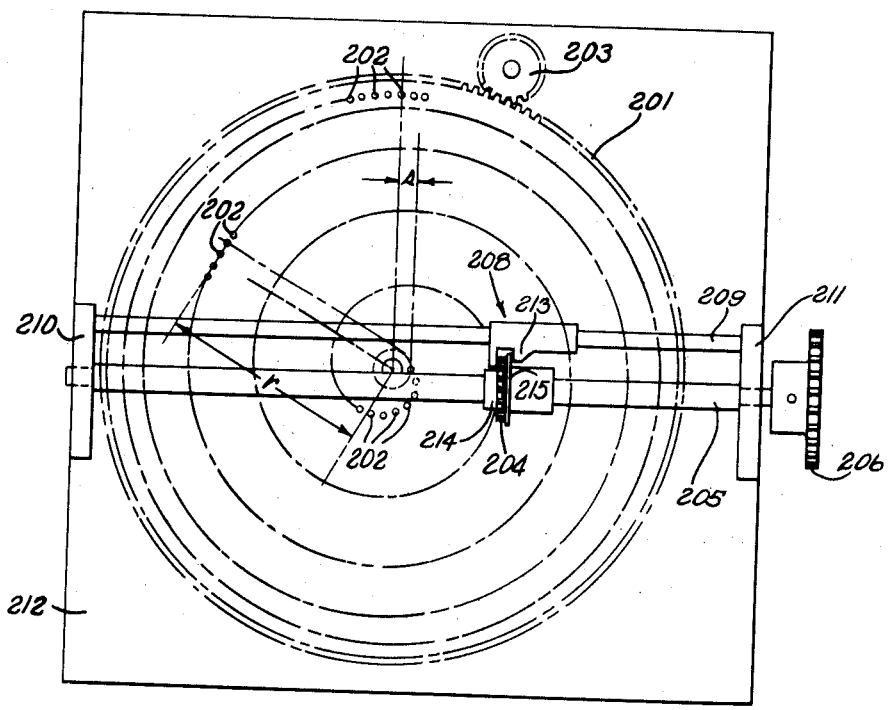
Fig. 1 is a plan view of a sine gear with associated input and output connections.
Figure 2:
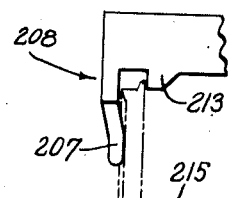
Fig. 2 is a fragmentary, detail plan view, showing the relation of certain parts of the output follower.
Figure 3:
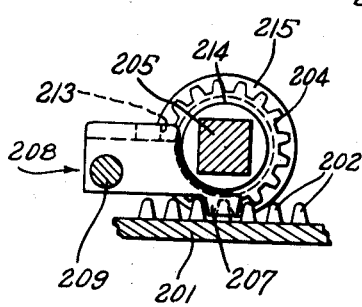
Fig. 3 is a fragmentary, vertical, sectional view showing details of the output connections.
Figure 4:
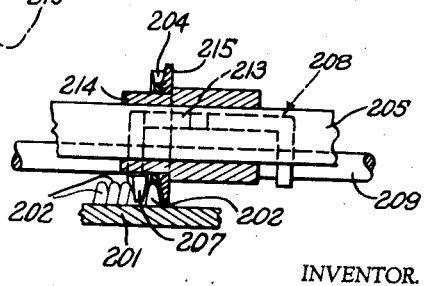
Fig. 4 is a fragmentary, vertical, sectional view showing details of the output connections.

The sine gear of Figures 1 to 4, 16 and 18 is illustrated as a five-turn spiral gear. This gear is operated in proportion to an input angle which is twenty times the basic angle, and the extent of output operation is constantly proportional to twenty times the sine of the basic angle if the effective radius R of the outermost tooth be taken as equal to 1. If $r$ be taken as the instantaneous effective radius of the spiral, then $$\frac{r}{R} = \frac{d(20 \sin x)}{d(20x)} = \cos x \quad (1)$$

The spiral gear 201 is provided with upstanding teeth 202 arranged upon a spiral track. This spiral gear is rotated by a gear 203, which is driven from an input operating member (not shown). The rotation of the gear 201 is proportional to the turning of the input member from the starting point, that is, from a position in which the basic input angle is zero. The teeth 202 drive a follower gear 204 which is slidingly mounted upon a square shaft 205. The shaft 205 carries an output gear 206 which is operated in proportion to the sine of the input angle.

By the input angle is meant the basic reference angle. For example, if the spiral gear is designed to turn through five revolutions to produce the sine outputs for a single quadrant, then the basic or reference angle is always one-twentieth of the actual angle through which the gear 201 has been turned from the starting point. The sine output is secured by making the effective radius of the spiral at every point proportional to the change of the sine of the basic angle with respect to the change of the basic angle, or, in other words, by making the effective radius always proportional to the cosine of the basic angle.

The term "effective radius" as used herein is intended to mean the projection of the true radius of a tooth upon a radius of the spiral gear parallel to the axis of the follower gear when the center of that tooth is in engagement with the follower gear and is located directly beneath the axis of the follower gear.

In order to induce the follower gear 204 to maintain driving engagement with the tooth 202 of the spiral track at all times, provision is made of a guide finger 207 to lie opposite the bottom of the gear 204. The finger 207 is carried upon a traveling arm 208 which is slidingly mounted upon a shaft 209. The shaft 209 is stationarily mounted in brackets 210 and 211 carried by a frame member 212. The brackets 210 and 211 also serve to rotatably support cylindrical bearing portions of the shaft 205.

The arm 208 is provided with a shouldered tooth 213 for engaging the rear face of the gear 204. At the forward side of the gear the arm extends inward across the forward face of the gear and bears against a cylindrical hub member 214 of the gear. Thus, the arm and the gear are constrained to move longitudinally as a unit.

As will be clearly seen in Figure 1, the axis of the shaft 205 does not intersect the axis of the gear 201, but instead passes to one side of it. As a result of this arrangement, when the spiral gear 201 is rotated in a counter-clockwise direction and the radius of the track is very small, the teeth 202 enter the gear 204 through the face of the gear. They leave the gear 204, however, through its periphery because they do not start to travel away from the gear in the direction of its axis until they have passed beyond the axis of the shaft 205.

It will be observed that the gear teeth 202 are in the form of rounded cones. The back of the gear 204 is in the form of a solid disc 215 having a forward face which slopes at substantially the same angle as the slope of the conical gear teeth 202. The finger 207 also has a tooth engaging surface of similar slope. The forward surface of the finger 207 is also similarly sloped so that the finger is tapering in form. This is important for the reason that at the very beginning of the operation the finger must extend part way across the space between the first and second teeth of the spiral. Otherwise, the mechanism could not be operated completely to a zero position.

When the spiral gear 201 has been operated through its entire cycle from the point of beginning (the outermost tooth) to the extreme innermost tooth of the spiral, an amount corresponding to 90° of the basic angle, the input may be automatically reversed (as fully disclosed and explained in Serial No. 113,572) so that the gear now travels back to the point of beginning, at which point the input may again be automatically reversed. Provision may also be made for the automatic reversal of the output relative to the gear at the beginning of every quadrant in which the since curve is a double mirror image of the sine curve of the preceding quadrant, all as clearly brought out in Serial No. 113,572.

While the gear 201 has been referred to as a sine gear, it may obviously be used as a cosine gear, as will be evident from the general laws $$\sin(90+x) = \cos x$$

and $$\cos(90+x) = -\sin x$$

With the aid of reversal mechanism as disclosed in Serial No. 113,572, the gear may be caused constantly to produce through all four quadrants an output equal to sine $x$ or an output equal to $(1-\cos x)$, $x$ being taken as the basic angle.

The axis of the shaft 205 is desirably offset from the axis of the spiral gear 201 by a sufficient amount to cause the circular pitch between the teeth of the spiral gear to remain substantially constant in the region of the innermost teeth. Each of the teeth of the spiral track engages the follower gear before it crosses beneath the axis of the follower gear, and leaves engagement with the follower gear after it crosses beneath the axis of the follower gear. In the latter position the tooth stands with its radius parallel or substantially parallel to the axis of the shaft 205 and the follower gear 204. Each tooth acts with a progressively increasing ratio from the time when it first engages the gear 205 until it leaves engagement with the gear.

A tooth space distance $a$ of the follower gear is the unit of output, and is the uniform increment of output imparted to the follower gear by each tooth of the spiral gear which passes through driving engagement with the follower gear, with the exception of the innermost and outermost teeth.

When a designated tooth of the spiral gear has been correctly located, the input up to and including that tooth, the output up to and including that tooth, and the effective radius of that tooth are known for the instant when the center of that tooth is directly under the axis of the follower gear, and these values are all consistent with one another under the formulas.

The correct position for the next tooth is determined by calculation and geometrical construction. First, the unit of output increment $a$ is added to the total known output through the designated tooth. The total input and the effective radius corresponding to this new total output are computed. The difference between the new, computed total input and the known total input through the designated tooth is the measure in radians of the angle which the effective radius of the new tooth makes with the effective radius of the designated tooth.

An offset circle 216 of radius $s$ is drawn on the gear pattern (see Figure 18) whose radius is equal to the amount that the follower gear axis is to be offset from the center of the spiral gear.

A radial line 217 is drawn on the gear pattern, displaced from a radial line 218 corresponding to the previous tooth 219 by an amount equal to the computed input increment angle. From the intersection of this radial line 217 with the offset circle 216 a tangential line 220 is drawn. The effective radius of the new tooth 221 as computed from the formula is now measured along this line 220 from the point of tangency to determine the correct location of the center of the tooth 221. This tangential line 220 will be found to be displaced from the corresponding line 222 of the previous tooth 219 also by an amount equal to the increment angle. The radius under the formula is measured along a tangent to the offset circle because this distance will represent the effective radius of the tooth when the center of the tooth is directly beneath the axis of the follower gear.

It will be observed that the tooth spacing of the spiral gear will not be uniform, and that the spacing between successive teeth may not correspond precisely in value with the uniform output increment $a$ which each tooth of the spiral gear other than the first tooth is required to impart to the follower gear. If space is provided between the bases of the follower gear teeth a little in excess of the thickness of the tips of the spiral gear teeth, however, the spiral gear tooth spacing may differ a little in value from the tooth increment $a$, and still the follower gear will be advanced one tooth space for each tooth of the spiral gear which passes through driving engagement with the spiral gear. The variation in spacing may not, however, be sufficient to cause binding to occur between the spiral gear teeth and the follower gear teeth.

The offsetting of the follower gear axis relative to the spiral gear axis is introduced and is so chosen in value that the variation in spacing of the innermost teeth of the spiral gear may be held to a minimum.

The same principle and procedure are followed in laying out the spiral gears to be referred to in connection with the other disclosed embodiments of the invention. In connection with these embodiments the "effective radius" as above identified will be referred to as the radius.

Figure 10:
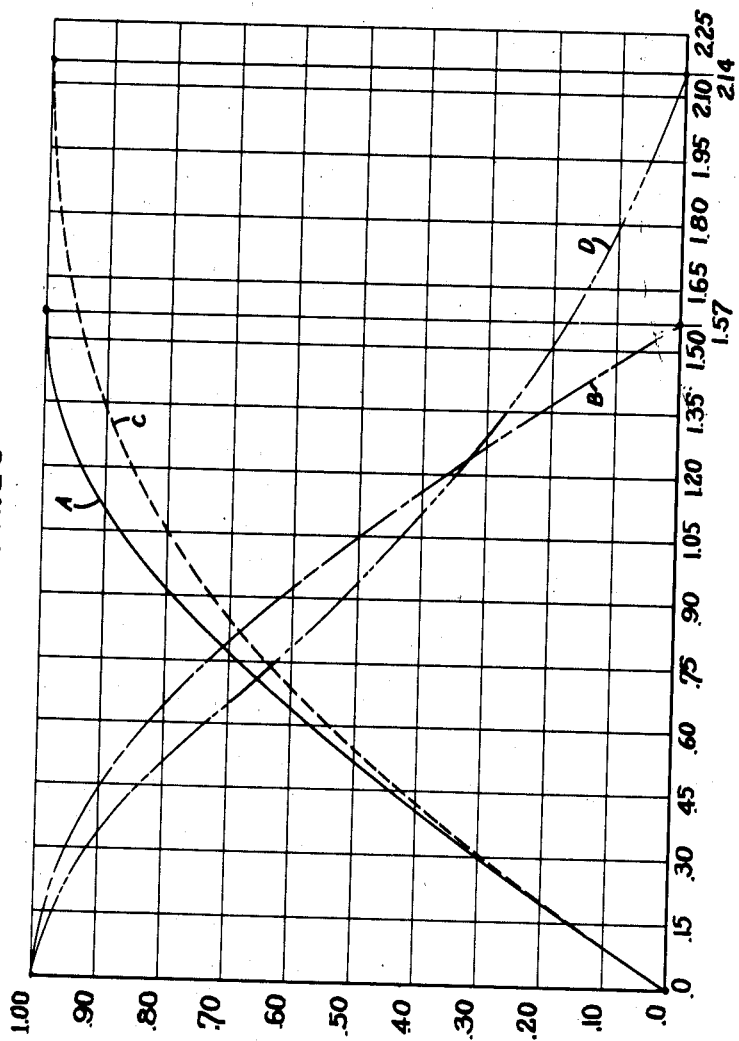
Fig. 10 is a graph illustrating how the correct design for the conversion gear of Fig. 5 may be conveniently ascertained, and showing the gain secured by utilizing the modified input-output law.

In Figure 10, curve A is the input-output curve of the sine gear, the abscissas being taken as equal to the basic angle $x$ in radians and the ordinates as equal to $\sin x$. This is the ordinary sine curve of the first quadrant, the input changing from a value of 0° to a maximum or final value of 90° or $\pi/2$, and the output changing from a value of zero to a maximum or final value of 1.

Figure 6:
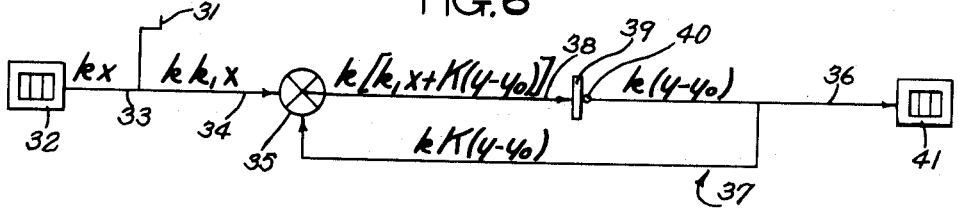
Fig. 6 is a diagrammatic view illustrating a novel mechanism for securing practical and advantageous results in connection with reciprocal functions.

Curve B of Figure 10 is an input-radius curve, the inputs $x$ being plotted as abscissas and corresponding values of $r$, ($\cos x$) being plotted as ordinates. In the cosine or input-radius curve, the region of least slope is critical as to the number of turns for which the spiral of the sine gear can be designed. It is evident at a glance that this region is at the very beginning of the curve B. If the case were doubtful, the axis of ordinates might be divided into twenty equal divisions and lines drawn through the division points parallel to the horizontal axis. That segment of the curve B whose horizontal projection is longest would then be the critical segment or interval. In the present instance, as already noted, the critical interval is the first interval, and the horizontal projection of that segment of the curve B is the measure of the input change required to change the effective radius $r$, ($\cos x$), from a value of 1 to a value of $(1-.05)$ or .95. Appropriate tables show that the angle whose cosine is .95 is approximately 18.2° or .318 radian. The total operation indicated by Fig. 6 is 90° or 1.57 radians. It is permissible to stretch out the spiral until this basic input angle is equivalent to one complete turn of the spiral gear, since that would yield a minimum turn spacing of exactly $$\frac{R}{20}$$

Figure 16:
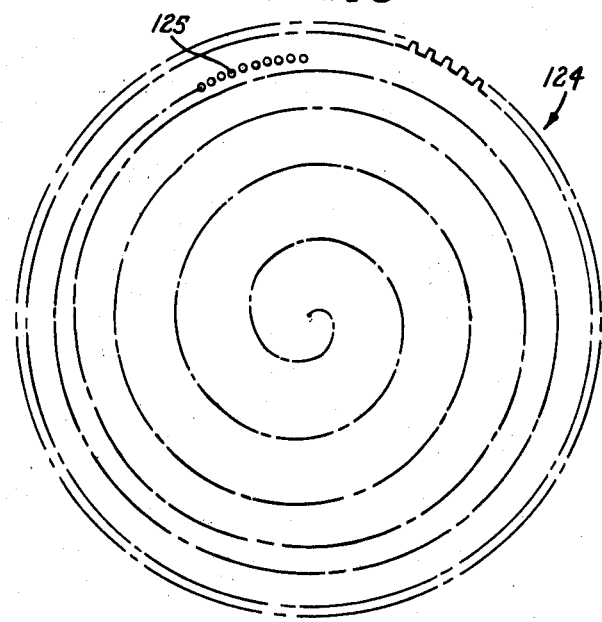
Fig. 16 is a plan view illustrating the spiral sine gear of Figure 1 which is available when the gear input is the angle and the gear output is the sine.

The total number of turns of the spiral track may, therefore, be about $$\frac{90}{18.2} \text{ or } \frac{1.57}{.318}$$

the number being approximately equal to 5. A spiral cam gear as constructed in accordance with these calculations is illustrated in Fig. 16.

This represents a twenty-fold multiplication of the angular input and of the sine output because the extended input $10\pi$ is twenty times the basic input $$\frac{\pi}{2}$$

In curve C of Fig. 10 it is assumed that the angular input $Kkx$ has subtracted from it a linear function of the gear output, $k.\sin x$, to provide a modified input for the spiral gear of $Kkx-k.\sin x$. This brings about a new law of gear operation and makes possible a new design of gear having an increased number of turns. In this case.

$$\frac{r}{R} = \frac{d(k \sin x)}{d(Kkx - x \sin x)} = \frac{\cos x}{K - \cos x} \quad (?)$$

By taking K equal to 2, the initial value of the radius will be 1, and the final value of the radius will be zero. Therefore, let K equal 2 and Equation 2 becomes $$\frac{r}{R} = \frac{\cos x}{2 - \cos x} \quad (3)$$

In curve C of Fig. 10 the abscissas are inputs $(2x-\sin x)$, and the ordinates are outputs ($\sin x$).

In curve D of Fig. 10 the abscissas are inputs $(2x-\sin x)$, and the ordinates are radii $$\frac{\cos x}{2 - \cos x}$$

The same procedure may be followed as has been outlined above in connection with the sine gear for determining how many turns the spiral gear may have. First, intervals are marked off on the axis of ordinates in the region or regions of least slope of curve B, these vertical intervals being taken to be $$\frac{R}{20}$$

The critical segment of the curve D is found to lie in the region between $$\frac{\cos x}{2-\cos x}=1 \text{ and } \frac{\cos x}{2-\cos x}=.95$$

The corresponding values of $\cos x$ are 1 and .9744, respectively, and the angles corresponding to these cosine values are zero and .277 radian. The value of $2x$ is .454 radian, and the value of $\sin x$ is .22495, so that $$2x-\sin x=.454-.22495=.22905$$

Figure 13:
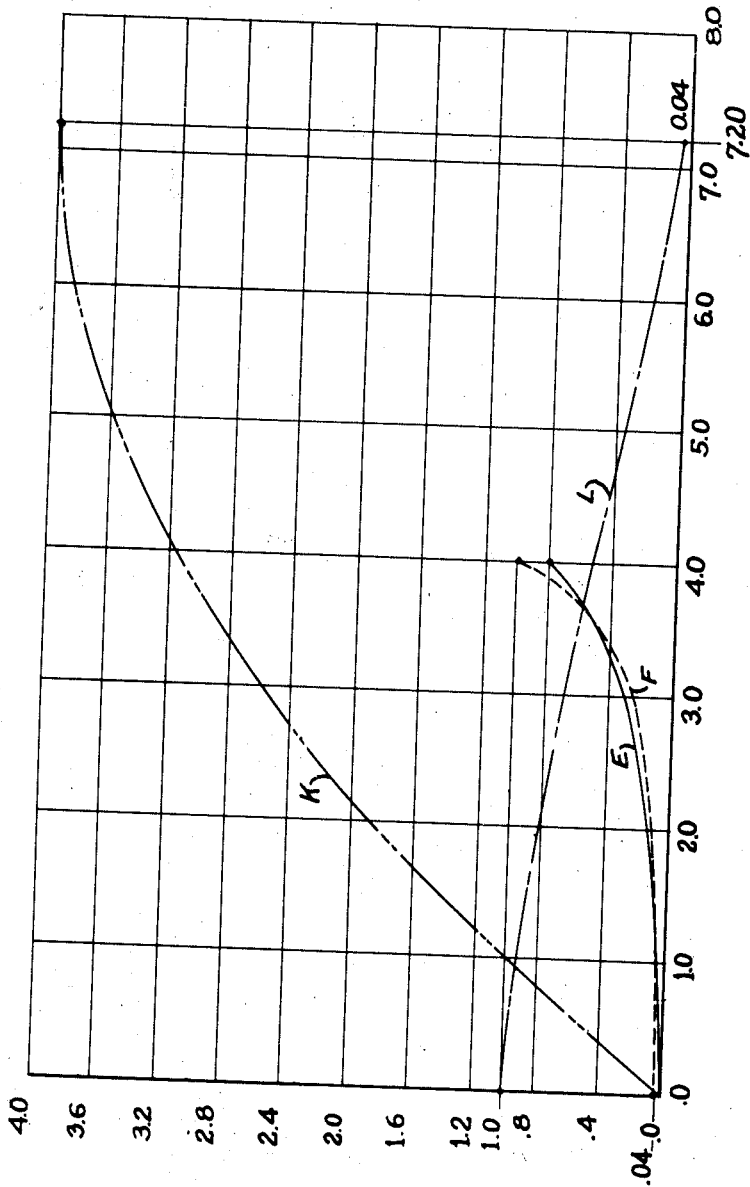
Fig. 13 is a graph similar to Fig. 10 but bearing upon the arrangement of Fig. 8.

In this case the total input is $2x-\sin x$ when $2x$ is equal to $\pi$ and $\sin x$ is equal to 1. The total input, therefore, is $\pi-1$, or 2.1416, and the total available turns are $$\frac{2.1416}{.22905}$$

which is approximately 9.5. The spiral gear constructed on the basis of these calculations is illustrated in Fig. 13.

The available value of $k$ may now be determined as follows:

The angular travel of the spiral gear in radians is equal numerically to the linear travel of the outermost tooth when the radius of that tooth R is taken as equal to 1. From the curve C of Figure 6 a total input of $(\pi-1)$ radians is necessary to produce an output of sin $x$ when $$x=\frac{\pi}{2}$$

If the input may have a value of 9.5 turns of the spiral gear, the total input becomes $19\pi$. The input has, therefore, been multiplied by $$\frac{19\pi}{\pi-1}$$

which is approximately 28. The output has been correspondingly multiplied. The value of $k$ is, therefore, 28. The primary input may, therefore, be $56x$, the modified input to the gear $56x-28$ sin $x$, and the output 28 sin $x$.

It is evident that by the simple device of modifying the input with a linear function of the gear output as described, the extensiveness of the output is increased about 40%, as compared with a sine gear of the same maximum tooth radius.

Figure 5:
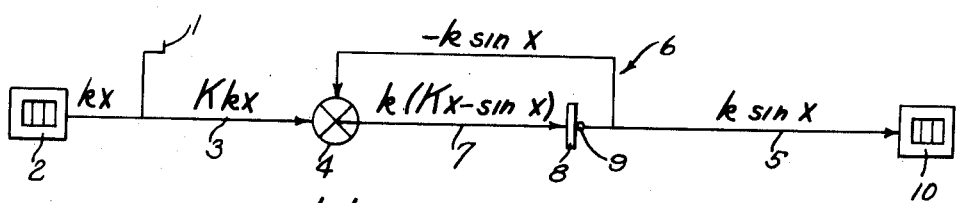
Fig. 5 is a diagrammatic view illustrating a novel mechanism for securing a sine output from an angular input.
Figure 15:
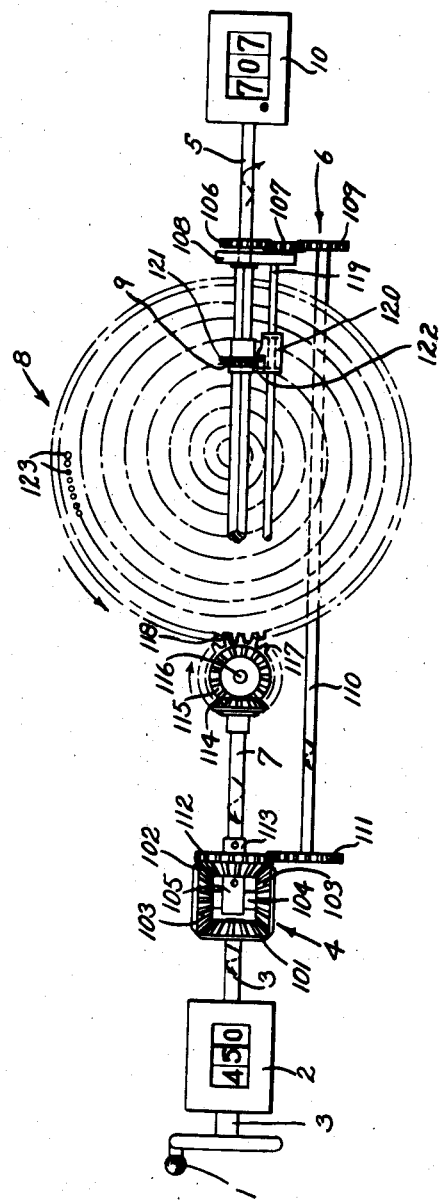
Fig. 15 is a plan view showing the mechanism embodied in the diagrammatic showing of Fig. 5.

The mechanism for producing this improved result is diagrammatically illustrated in Figure 5, and is more fully illustrated in Figure 15.

Referring first to Figure 5, an input crank 1 may be turned through approximately fourteen full turns to run in a basic angle of 90°. The crank may drive a counter 2 for continuously exhibiting the basic angle $x$. The crank also drives a shaft 3 which feeds an input $56x$ into a differential gear 4. An output shaft 5 is connected through a train 6 to feed 28 times the sine of the basic angle $x$ into the differential gear 4. From its two inputs, 3 and 6, the differential gear 4 transmits to the direct input shaft 7 of a spiral gear 8 an input equal to $56x-28$ sin $x$. A follower crown gear 9 is driven rotatively by the teeth of the spiral track of the spiral gear 8, and is propelled lengthwise of the shaft 5 by the teeth of the track. The shaft 5 is desirably made square and the follower gear 9 is formed with a square central opening that fits the shaft 5 without binding. Shaft 5 may drive a counter 10 for continuously exhibiting the sine of the basic angle.

As in the case of the sine gear, the axes of the output shaft 5 and the spiral gear 8 do not intersect in a common plane. The axis of the shaft 5 is desirably offset from the axis of the spiral gear 9.

An actual physical structure is illustrated in Figure 15 embodying the principle of construction and the operation diagrammatically illustrated in Figure 1. The crank 1 is mounted directly on the shaft 3 which runs through the counter 2. The shaft 3 drives the number wheels of the counter 2 constantly to exhibit the basic angle. The differential gear 4 comprises a bevel gear 101 fast on the shaft 3, a bevel gear 102 revoluble on the shaft 7, and a pair of planetary bevel gears 103 in mesh with the gears 101 and 102, and revolubly mounted upon stub shafts 104, the stub shafts being carried by a sleeve 105 which is pinned to the shaft 7.

The train 6 comprises a gear 106 fast on the shaft 5, which gear, through a counter gear 107 mounted on a stationary bracket 108, drives a gear 109 fast on a shaft 110. The shaft 110 has fast upon it a gear 111 which drives a gear 112 fast with the bevel gear 102 of the differential 4. A collar 113 pinned to the shaft 7 cooperates with the sleeve 105 to restrain the gear combination 102, 112 against movement longitudinally of the shaft 7 while permitting the gear combination to rotate relative to the shaft.

It is characteristic of the illustrated differential 4 that rotation of the input gear 101 in either direction will produce an output rotation of the shaft 7 in the same direction in which the gear 101 is turned, but of half the angular extent of the turning of the gear 101. Similarly, it is characteristic of the differential that any rotation of the inner gear 102 will produce a rotation of the shaft 7 in the same direction in which the gear 103 is turned, but of one-half the angular extent. Because the differential divides the differential inputs by two it is necessary that the input magnitudes be doubled. The shaft 3 is accordingly arranged to be turned an amount equal to $4kx$ in order to cause the counter 2 to indicate the angle $x$, and the gears 111 and 112 are proportioned to cause the latter gear to travel twice the angular amount of the former to provide an input of $-2k$ sin $x$. The input $4kx$ applied to the shaft 3 is transmitted as an input $2kx$ to the shaft 7. Similarly, the input $-2k$ sin $x$ of gear 112 is transmitted to the shaft 7 as an input $-k$ sin $x$.

The shaft 7 has fast upon it a bevel gear 114 which meshes with a bevel gear 115 mounted on a shaft 116. The gear 115 has fast with it a spur gear 117 which drives the spiral cam gear 8 through circumferentially disposed gear teeth 118.

The speed ratio of shaft 7 to gear 8 is the same as the ratio of the radius of the outermost spiral tooth to the radius of the follower gear 9.

A rod 119 runs parallel to the shaft 5 and carries a notched follower block 120 which embraces a flange 121 of the follower gear 9. The follower block 120 is provided with a finger 122 which coacts with the flange 121 to embrace the active portion of the spiral track of the gear 8 for propelling the follower gear toward the center of the gear 8 when the gear 8 is turned in a clockwise direction. The details of this structure are more fully shown and described in Serial No. 113,572.

Figure 17:
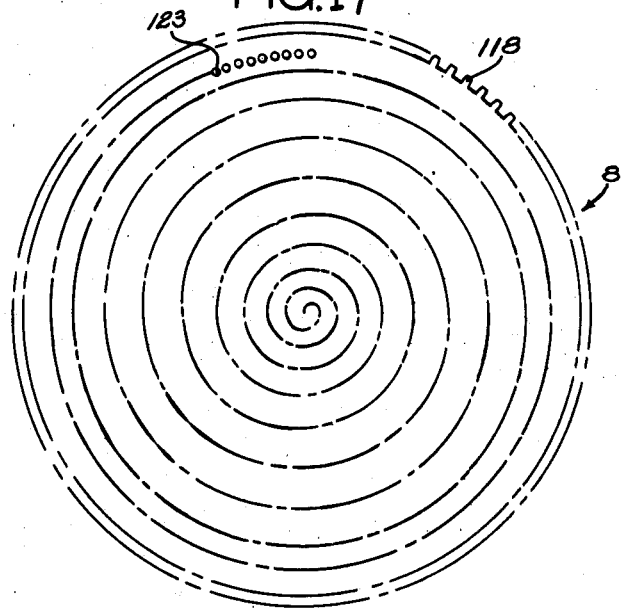
Fig. 17 is a plan view of the spiral gear of Figs. 5 and 15, the gear being of the same size as the gear of Fig. 16.
Figure 18:
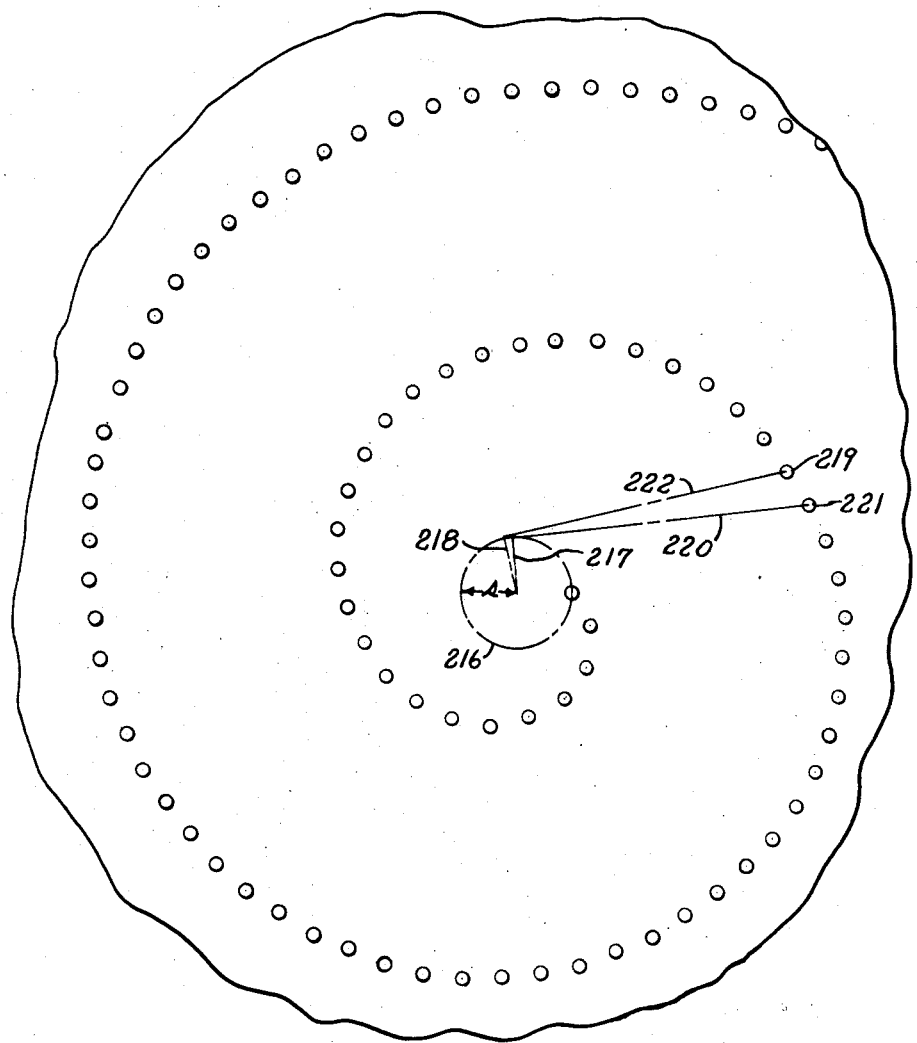
Fig. 18 is an enlarged fragmentary view illustrating how the correct locations for the spirally arranged teeth are determined.

The spiral gear 8 is illustrated in Figure 17 on a larger scale than in Figure 15, a few of the spirally arranged teeth 123 being shown, and the remainder of the spiral track being indicated in dot and dash lines. As a basis of comparison, a spiral gear 124 of the same size is illustrated in Figure 16, a few of the spirally arranged teeth 125 being shown and the remainder of the spiral track being indicated in dot and dash lines. The gear of Figure 16 is the sine gear of Serial No. 113,572. From a comparison of Figures 16 and 17 it will at once be evident that modification of the input to the gear 8 has been effective to bring about a very much more even distribution of spiral turns, and that a very considerably increased number of spiral turns may be provided.

In Figure 6, disclosure is made of mechanism which is useful in securing an output $y$ from an input $x$ when $y$ and $x$ are connected by a law such as $$y = \frac{1}{5-x} \quad (4)$$

Figure 11:
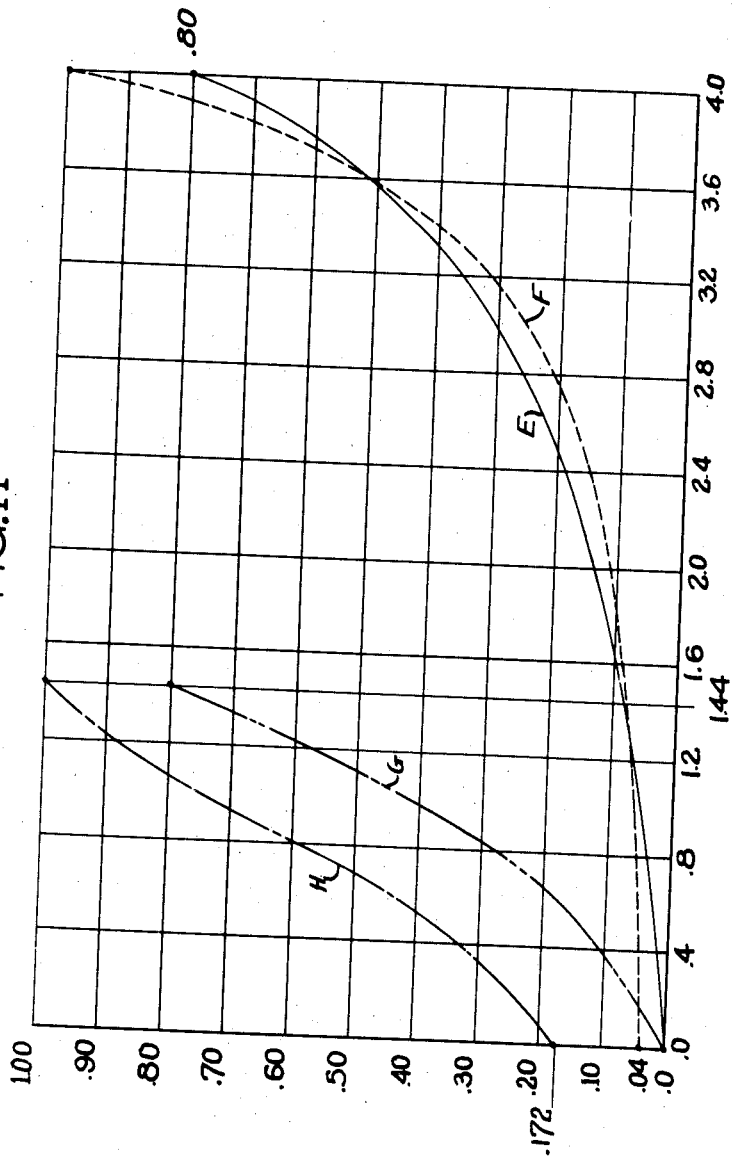
Fig. 11 is a graph similar to Fig. 10 but bearing upon the arrangement of Fig. 6.

The characteristics of the spiral gear here employed are analyzed and compared in Figure 11 with the kind of spiral gear which might be attempted for directly securing $y$ as an output from $x$ as an input. From Equation 4 it is evident they $y$ is equal to $\frac{1}{5}$ when $x$ is equal to zero. The mechanism is arranged to operate between the limits $x=0$ and $x=4$. The extent of output operation is, therefore, always equal to $(y-y^0)$ or $(y-\frac{1}{5})$. From Equation 4 it is readily ascertainable that $$k(y-\frac{1}{5}) = \frac{kx}{5(5-x)}$$

Since $y^0$ is a constant, $\frac{1}{5}$, it is immaterial in determining the law for the value of the radius, whether $y$ or $(y-y_0)$ be treated as output. In this case $$r = \frac{kd(y-y_0)}{kdx} = \frac{dy}{dx} = \frac{1}{(5-x)^2} \quad (5)$$

From the above expression it will be noted that $$dy = \frac{dx}{(5-x)^2} \quad (6)$$

In curve E of Figure 11 inputs, $x$, are taken as abscissas and outputs $(y-y_0)$ are taken as ordinates.

In curve F inputs, $x$, are taken as abscissas and radii, $$\frac{1}{(5-x)^2}$$

are taken as ordinates. It is at once apparent, of course, that the radius curve is a very unsatisfactory curve for the construction of a spiral gear. When $x$ is zero, $r$ is .04. A change in radius of .05, would make $r$ equal to .09, at which point the input, $x$, would have increased in value from zero to $\frac{5}{3}$. This amount of input, barring other limiting factors, could be expanded to one turn of a spiral gear or $2\pi$. Since the total input is equal to 4, a spiral of only $2\frac{2}{5}$ turns would be possible in a gear of the size previously assumed. On the basis of the previous analysis for determining the value of $k$, it will be observed that the input of four radians is increased to $$\frac{24\pi}{5}$$

radians, or in the ratio of $$\frac{6\pi}{5}$$

which is approximately 3.8. The value of $k$ in this case would, therefore, be approximately 3.8.

In the form of mechanism illustrated in Fig. 6, a linear function of the output, $kK(y-y_0)$, is fed back and combined additively with a linear function of the primary input $kk_1x$ to provide a modified gear input, $k[k_1x + K(y-y_0)]$, from which the gear is required to derive the output $k(y-y_0)$.

In curve G of Figure 11, K is taken equal to $\frac{4}{5}$ and $k_1$ is taken equal to $\frac{1}{5}$. Inputs, $$x\left[\frac{1}{5} + \frac{4}{25(5-x)}\right]$$

are taken as abscissas, and outputs, $(y-y_0)$, are taken as ordinates.

In curve H of Figure 11, inputs $$x\left[\frac{1}{5} + \frac{4}{25(5-x)}\right]$$

are taken as abscissas, and corresponding radii, $$\frac{5}{(5-x)^2 + 4}$$

are taken as ordinates.

Examining the input-radius curve, it is evident that the radius changes least in relation to input at the beginning of the curve. When $x$ is equal to zero the gear input is zero, and the radius is $\frac{5}{29}$. When the radius is equal to $$\frac{5}{29} + \frac{1}{20} = .22$$

the value of $x$ is .67, and the extent of input operation is .18. When $x$ is equal to 4, the extent of input operation is 1.44. The gear may accordingly be designed for $$\frac{1.44}{.18}$$

turns or about 8 turns. The total input to the gear would then be $16\pi$ and the ratio of this magnified input to the previous input of 1.44 is approximately 35 to 1. The value of $k$ in this case is, therefore, approximately 35 as compared with a maximum available value of 3.8 when $kx$ and $ky$ were the direct inputs and outputs, respectively, of the hypothetical structure assumed for purposes of comparison. The value of $kk_1$ is 7.

As illustrated in Figure 6, a crank 31 is turned to drive a counter 32 through a shaft 33 for continuously exhibiting the value of $x$. The crank also drives a shaft 34 in proper ratio to feed the input $kk_1x$ to a differential gear 35. The output shaft 36 drives a train 37 to feed $k(y-y_0)$ positively into the differential gear 35. The differential gear 35 transmits to a shaft 38 a modified input $k[k_1x + K(y-y_0)]$ for driving a spiral gear 39. The teeth of the spiral gear 39 drive a follower crown gear 40 which is mounted for sliding movement longitudinally of the shaft 36, but is connected to rotate the shaft 36 positively in unison with itself. The shaft 36 may drive a counter 41 for constantly indicating the value of $y$. The gear 39 is constructed and laid out upon exactly the same principles explained in connection with the gear 8 of Figures 5, 15 and 18.

In what has been said up to this point, it has been assumed that a follower gear of specified thickness, diameter and number of teeth (such as would be suitable for a five-turn sine gear) is always available. This is not necessarily the case, however, since characteristics of the spiral gear may impose limitations upon the characteristics of the follower gear. If the radius of the spiral changes very abruptly in relation to the uniform increment of output, the thickness of the follower gear may have to be materially increased to broaden the follower gear teeth for simultaneous engagement with consecutive teeth of the spiral gear of substantially different radii. From this point of view it may be preferable in some instances for the tightly bunched turns of an uneven spiral to be located at the inside of the spiral.

In most instances, however, it is advantageous for the tightly bunched turns of an uneven spiral to be located at the outside of the spiral, and for the relatively abrupt change of radius to occur at the inside. If the spiral teeth are widely separated in the inner turns of the spiral, the increment angle per tooth is relatively large, and this militates against accuracy, smooth continuity of output, and proper meshing conditions of the teeth. If the tooth space increment of output is taken very small, a great number of teeth is required upon the spiral gear, and the teeth are necessarily very small and fragile. The follower gear teeth are correspondingly small and fragile. A reduction in the size of a follower gear tooth does not necessarily require a reduction of diameter of the follower gear below a practical size, because the number of teeth on the follower gear might be increased to compensate for the reduced size of each tooth. A close packing of spiral turns at the inside of the spiral gear does impose a limitation upon the diameter of the follower gear, however, because the follower gear must extend between adjacent turns of the spiral for a considerable distance in a direction at right-angles to the follower gear axis. As the diameter of the follower gear is increased, the horizontal projection of that portion of the gear which stands between adjacent turns of the spiral is increased. This portion of the follower gear must be able to engage a tooth of the inner turn which is in driving engagement with the gear, and at the same time to clear any teeth of the outer turn which stand in the plane of the outer face of the follower gear.

Figure 7:
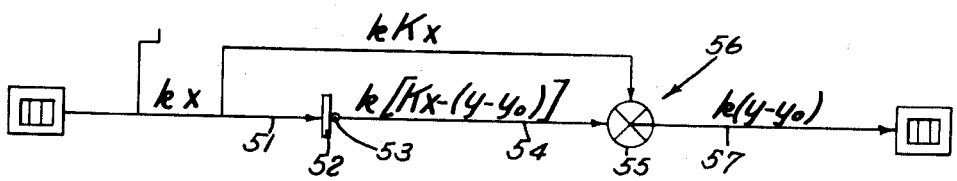
Fig. 7 is a further diagrammatic view illustrating a further mechanism for securing a modified input-output law.

Whatever the most desirable arrangement may be in any specific application, a mechanism operating upon the principle of that disclosed in Figure 7 may be utilized to permit the closely packed turns of the spiral to be located at the inside or at the outside as desired. In the mechanism of Figure 7, the closely packed turns are transferred from the inside to the outside of the spiral gear. This mechanism is graphically analyzed in Figure 12 and will be explained by reference to that figure.

Figure 12:
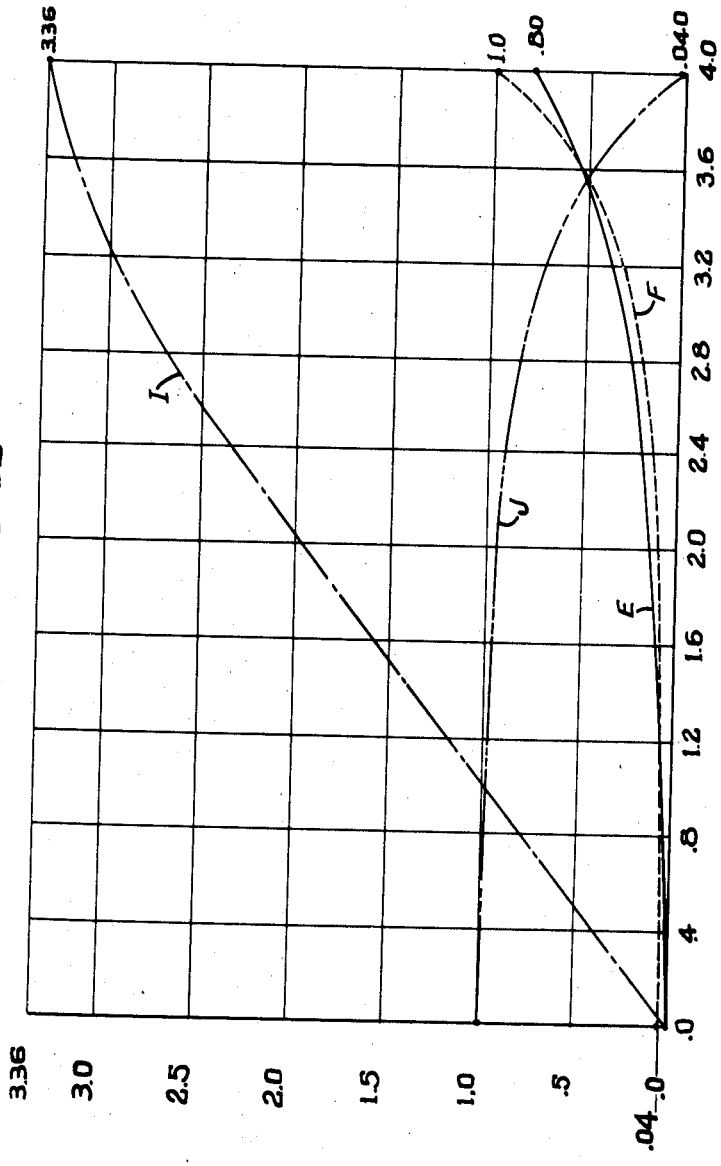
Fig. 12 is a graph similar to Fig. 10 but bearing upon the arrangement of Fig. 7.

In Figure 12 the input-output curve E of Figure 11 is repeated, and the input-radius curve F of Figure 11 is also repeated. These curves are based upon the input-output equation $$y = \frac{1}{5-x}$$

and the radius equation $$r = \frac{1}{(5-x)^2}$$

If the output of the spiral gear (whose input is $kx$) is subtracted from a linear function $kKx$ of the input $kx$, continuously to produce a prescribed output, $k(y-y_0)$, it is evident that the input $kx$ is required to produce through the spiral gear a direct gear output equal to $$k[Kx-(y-y_0)].$$

In such a case the law governing the radius of the gear will be $$\frac{r}{R} = \frac{kd[Kx-(y-y_0)]}{kdx} = K - \frac{dy}{dx} = K - \frac{1}{(5-x)^2} \quad (7)$$

The constant K in Equation 7 should have a value of 1.04 to make the maximum radius equal to 1. The change of radius which will have occurred from the starting point up to any selected magnitude of input will be precisely the same as when $$r = \frac{1}{(5-x)^2}$$

In this case, however, the radius starts with a value of 1, and when three-quarters of the input has been run in, $(x-3)$, the radius still has a value of .79. The closely packed turns have, therefore, been transferred to the outside of the spiral as compared with the hypothetical spiral under the direct input-output method as analyzed in connection with curves E and F of Figure 11. The inside of the spiral, instead of being overcrowded, is made wide open.

In curve I of Figure 12 inputs, $x$, have been taken as abscissas and outputs, $$1.04x - \frac{x}{5(5-x)}$$

have been taken as ordinates. In curve J of Figure 12 inputs, $x$, have been taken as abscissas and radii, $$1.04 - \frac{1}{(5-x)^2}$$

have been taken as ordinates. The curve admits of the same degree of multiplication as does the curve F under the principles discussed in connection with Figure 11, but would admit of more practical and satisfactory operation when expanded.

In Figure 7 the input $kx$ is fed into input shaft 51, and is transmitted by the shaft to a spiral gear 52. The spiral gear 52 drives a follower gear 53 which is slidable along a spiral gear output shaft 54, but which rotates the shaft in unison with itself. The shaft 54 feeds the output $$k[Kx-(y-y_0)]$$

into a differential gear 55 for subtraction from a linear function of the input, $kKx$. A train 56 transmits the linear function of the input, $kKx$, from the input shaft 51 to the differential 55, and the differential 55 transmits the resulting ultimate output, $k(y-y_0)$, to an ultimate output shaft 57.

Figure 8:
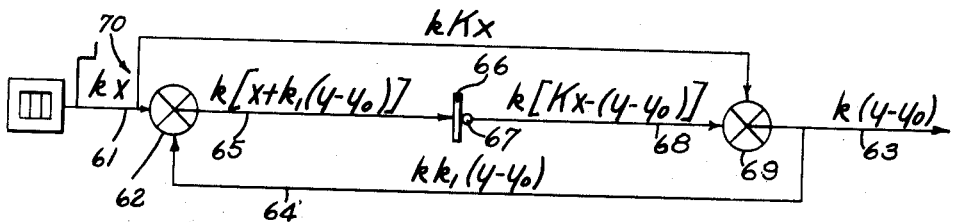
Fig. 8 is a further diagrammatic view illustrating a combination of the principles of Figs. 6 and 7.

In Figure 8 disclosure is made of mechanism for modifying the primary input by a linear function of the ultimate output to secure a modified gear input, and of modifying the gear output by a linear function of the primary input to secure the ultimate output. This combination is not to be confused with the relatively simple case of Figure 7, in which the gear output is modified by a linear function of the gear input. In Figure 8 the modification applied to the gear is not a linear function of the gear input because the gear input does not bear a linear relation to the primary input.

In Figure 8 the primary input $kx$ is fed by primary input shaft 61 to a differential gear 62. An ultimate output shaft 63 through a train 64 feeds a linear function of the ultimate output, $kk_1(y-y_0)$ to the differential gear 62 for addition to the primary input to provide a modified spiral gear input. The differential gear 62 feeds the modified input $k[x+k_1(y-y_0)]$ through a spiral gear input shaft 65 to a spiral gear 66. The spiral gear output $k[Kx-(y-y_0)$ is transmitted by follower gear 67 to a gear output shaft 68, which feeds into a differential gear 69. A train 70 feeds a linear function of the primary input, $kKx$, to the differential gear 69, and the differential gear 69 transmits the difference between its two inputs to the shaft 63 as the ultimate output, $k(y-y_0)$.

In Figure 13 curves E and F are repeated from Figure 11. The same basic equation $$y = \frac{1}{5-x}$$

is assumed to control. In curve K inputs, $$x\left[1+\frac{k_1}{5(5-x)}\right]$$

are taken as abscissas, and outputs, $$x\left[K-\frac{1}{5(5-x)}\right]$$

are taken as ordinates.

In curve L the same inputs as for curve K are taken as abscissas, and radii $$\frac{(5-x)^2K-1}{(5-x)^2+k_1}$$

are taken as ordinates. The constant K is taken equal to $\%$, and the constant $k_1$ is taken equal to 4. It is not thought necessary to go into detail as to the extent to which the spiral of Figure 9 may be expanded in view of the fact that the principles underlying that calculation have already been fully explained and exemplified in connection with Figures 5, 6, 10 and 11.

The procedure followed in selecting the most advantageous values for K and $k_1$ may bear some further explanation. First, a relationship of K and $k_1$ is determined from the radius equation which will yield a maximum radius of 1 or approximately 1 and a minimum radius of zero or nearly zero. This is found to be $k_1=25K-26$ when the maximum radius is 1 and the minimum radius is .04. Then the formula for the change of the radius with respect to the change of gear inputs is developed, this formula being as follows:

$$\frac{dr}{dI}=-2(Kk_1+1)\left[\frac{5-x}{(5-x)^2+k_1}\right]^2 \quad (8)$$

It is evident upon inspection of the above formula that the factor $(Kk_1+1)$ does not change as $x$ changes, regardless of the values selected for K and $k_1$. The least variation of slope of curve L will occur, therefore, when there is the least variation in value of $$\frac{5-x}{(5-x)^2+k_1}$$

between the limits $x=0$ and $x=4$. When K is taken equal to $\%$ and $k_1$ to 4, the gear ratios are simple and the uniformity of slope of the input-radius curve is near the optimum. The particular arrangement illustrated and described will provide a little more than a ten-turn spiral. The value of $k$ is approximately 9, and this measure of gain is fully realized since $k$ is the multiplier both of $x$ as put into the spiral gear and of $y-y_0$ as derived from the spiral gear.

Figure 9:
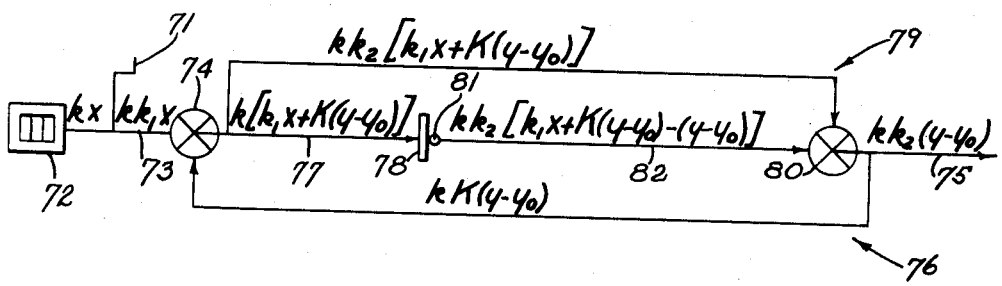
Fig. 9 is a further diagrammatic view illustrating another new way of combining the principles of Figs. 6 and 7.

In the mechanism of Figure 9 the principles of Figures 6 and 7 are combined. A primary input $kx$ may be put in through a crank 71, causing the angle $x$ to be exhibited in a counter 72 and the input $kk_1$ to be transmitted through input shaft 73 to a differential gear 74. An ultimate output shaft 75 transmits a linear function $kK(y-y_0)$ of the ultimate output through a train 76 to the differential 74 for addition to the input $kk_1$ to provide a modified spiral gear input $k[k_1x+K(y-y_0)]$. The differential 74 feeds this modified input through a shaft 77 to a spiral gear 78. A train 79 transmits a linear function of the modified input, $kk_2[k_1x+K(y-y_0)]$ to a differential gear 80 so that the ultimate output $kk_2(y-y_0)$ may be secured by subtracting the gear output from it. The gear is, therefore, required to derive from the modified input an output of $kk_2[k_1x+K(y-y_0)(y-y_0)]$. This output is fed through a follower gear 81 and a gear output shaft 82 to the differential 80.

Figure 14:
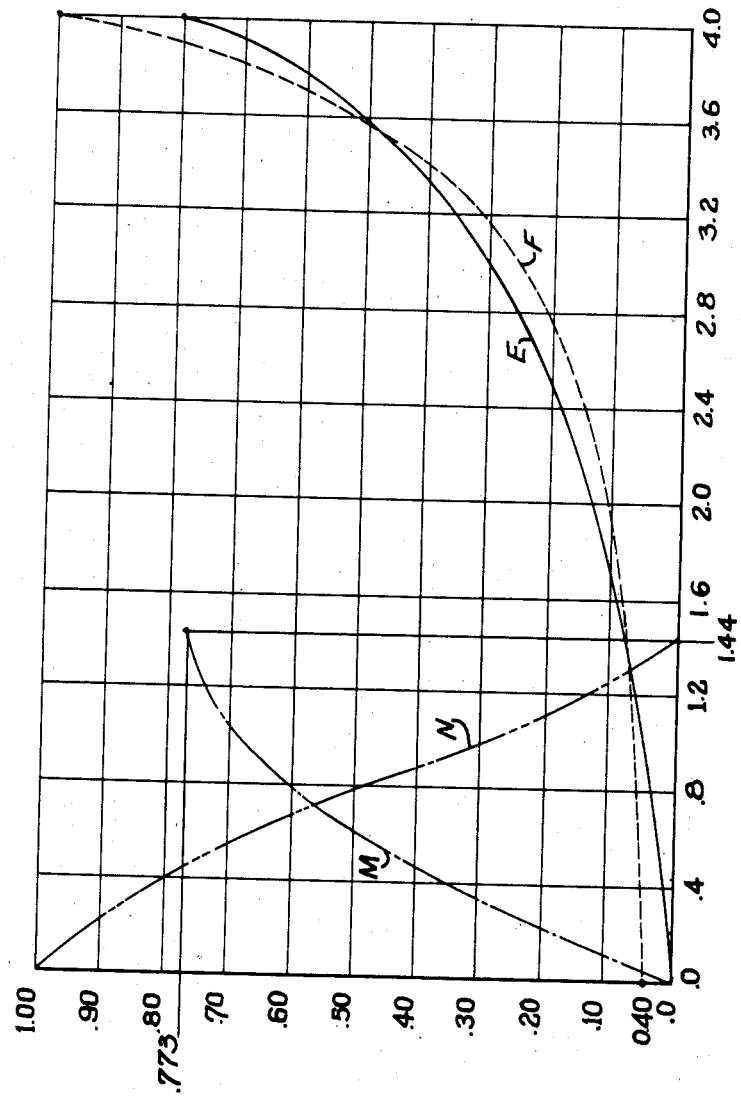
Fig. 14 is a graph similar to Fig. 10 but bearing upon the arrangement of Fig. 9.

In Figure 14 the mechanism of Figure 9 is graphically illustrated. The curves E and F of Figure 11 are repeated. Curves M and N are still assumed to be based upon the law $$y=\frac{1}{5-x}$$

In curve M inputs $$x\left[k_1+\frac{K}{5(5-x)}\right]$$

are taken as abscissas and outputs $$k_2x\left[k_1+\frac{K-1}{5(5-x)}\right]$$

are taken as ordinates.

In curve N the same inputs are used as abscissas and corresponding radii $$k_2\left[\frac{k_1(5-x)^2+(K-1)}{k_1(5-x)^2+K}\right]$$

are used as ordinates. The values of K, $k_1$ and $k_2$ are taken, respectively, as $\%$, $\frac{1}{5}$ and $\frac{29}{24}$. The change of radius for a given increment of input is $\frac{29}{24}$ times as great as the change of radius for a like increment of input in curve H of Figure 11. The full radius is utilized and more turns can be secured in a spiral of specified maximum radius. The spiral works from the outside toward the center as the value of the input increases.

We have described what we believe to be the best embodiments of our invention. We do not wish, however, to be confined to the embodiments shown, but what we desire to cover by Letters Patent is set forth in the appended claims.

We claim:

1. In a transmission device for continuously securing from a variable input, a prescribed output which is dependent in value upon the value of the input, but which bears a predetermined non-linear relation to the input, a spiral gear, gear input means for driving the gear, gear output means driven by the gear, a primary input member, means for combining with the input from the primary input member a predetermined linear function of the spiral gear output to provide a modified input, said combining means being connected to feed the modified input to the gear input means, and said spiral gear being constructed and arranged to produce the prescribed output from such modified input.

2. In a transmission device for continuously securing from a variable primary input, a prescribed ultimate output which is dependent in value upon the value of the primary input but which bears a predetermined non-linear relation thereto, in combination, a spiral gear, gear input means for driving the gear, gear output means driven by the gear, a primary input member, an ultimate output member, means connected to be driven by the ultimate output member and by the primary input member for combining with the input from the primary input member a predetermined linear function of the ultimate output to provide a modified input, said combining means being connected to feed the modified input to the spiral gear input means, means connected to be driven by the primary input member and the gear output member for combining a linear function of the primary input with the output from the gear to provide the desired ultimate output, said last mentioned combining means being connected to feed the so modified output to the ultimate output member, and said spiral gear being constructed and arranged to derive from the modified input the necessary non-linear function thereof for combination with the linear function of the primary input to secure the prescribed ultimate output.

3. In a transmission device for continuously securing from a variable primary input, a prescribed ultimate output which is dependent in value upon the value of the primary input but which bears a predetermined non-linear relation thereto, in combination, a spiral gear, gear input means for driving the gear, gear output means driven by the gear, a primary input member, an ultimate output member, means connected to be driven by the ultimate output member and by the primary input member for combining with the input from the primary input member a predetermined linear function of the ultimate output to provide a modified input, said combining means being connected to feed the modified input to the gear input means, means connected to be driven by the gear input means and the gear output means for combining with the gear output a linear function of the modified input, said last mentioned combining means being connected to feed the combined output to the ultimate output member, and said spiral gear being constructed and arranged to derive from the modified input the necessary non-linear function thereof for combination with the linear function of the modified input to secure the prescribed ultimate output.

4. In a transmission device for continuously securing from a variable input, a prescribed output which is dependent in value upon the value of the input but which bears a predetermined non-linear relation thereto, in combination, input means, means operated by the input means for transmitting an output which is a linear function of the input, variable conversion gearing operated by the input means, and including a flat spiral gear and a cooperative follower gear disposed at right angles to the flat spiral gear and operative in the space between adjacent turns of the spirally arranged teeth for deriving and transmitting a non-linear function of the input, the constant ratio of the linear function of the input to the input being not less than, and substantially equal to, the maximum ratio of output rate to input rate of the variable ratio conversion gearing, and means for subtracting the non-linear function of the input from the linear function of the input to produce the prescribed output.

5. In a transmission device for continuously securing from a variable input, a prescribed output which is dependent in value upon the value of the input but which bears a predetermined non-linear relation thereto, in combination, variable conversion gearing, input means for said conversion gearing, output means for said conversion gearing, means for applying an input to the gear input means, and means for concurrently applying a linear function of the gear output to the gear input means.

6. In a transmission device for continuously securing from a variable input a prescribed output which is dependent in value upon the value of the input but which bears a predetermined non-linear relation thereto, in combination, variable conversion gearing, input means for said conversion gearing, output means for said conversion gearing, means for applying an input to said input means, means for concurrently applying a linear function of the prescribed output to said input means to provide a combined gear input, and means for combining a linear function of said combined gear input with the gear output to produce the prescribed output.

7. In a transmission device for continuously securing from a variable input a prescribed output which is dependent in value upon the value of the input but which bears a predetermined non-linear relation thereto, in combination, variable conversion gearing, input means for said conversion gearing, output means for said conversion gearing, means for applying an input to said input means, means for concurrently applying a linear function of the prescribed output to said input means to provide a combined gear input, and means for combining a linear function of the original input with the gear output to produce the prescribed output.

8. Variable ratio gearing for continuously securing as an output from a prescribed input a non-linear function of the input whose first derivative is also a non-linear function of the input comprising, in combination, a variable ratio gear having spirally arranged teeth, an output shaft having the axis thereof disposed in a plane transverse to the axis of the variable ratio gear but offset a predetermined amount with respect to the axis of said gear, a follower gear movable longitudinally of said shaft but constrained to rotate in unison with the shaft, and guide means movable lengthwise of the output shaft with the follower gear and cooperative with the follower gear to straddle the teeth of the variable ratio gear for causing the follower gear to be moved lengthwise of the output shaft by the teeth of the variable ratio gear.

9. Variable ratio gearing as claimed in claim 8 in which the guide means comprises a guide finger opposed to the follower gear, and in which the teeth of the variable ratio gear are of conical form, the follower gear being formed with a solid back, and said back and guide finger having sloping tooth-engaging surfaces corresponding in slope substantially to the slope of the conical teeth.

10. Variable ratio gearing as claimed in claim 8 in which the guide means comprises a guiding finger opposed to the follower gear, the teeth of the variable ratio gear are of conical form, the follower gear is formed with a solid back, said back and said guide finger have sloping, confronting, tooth-engaging surfaces corresponding in slope substantially to the slope of the conical teeth, and the guide finger has its surface remote from the follower gear sloped to enable the finger to pass between the two innermost teeth of the spiral track.

11. Variable ratio gearing as claimed in claim 8 in which the guide means comprises a guide finger opposed to the follower gear, and in which the teeth of the variable ratio gear are of conical form, the follower gear being formed with a solid back, and said back and guide finger having sloping tooth-engaging surfaces corresponding in slope substantially to the slope of the conical teeth, the arrangement being such that the teeth of the variable ratio gear which are set upon short radii enter the follower gear through the face thereof at one side of the guide finger, pass behind the finger, and leave the follower gear through the periphery thereof.

12. Variable ratio gearing for continuously securing from an input which is a fixed multiple of a basic angle that varies between 0° and 90°, an output which is a fixed multiple of a trigonometric function of the angle that varies between 0 and 1 in the first quadrant comprising, in combination, a variable ratio gear having teeth arranged at intervals along a spiral track, an output shaft having the axis thereof disposed in a plane transverse to the axis of the variable ratio gear but offset a predetermined amount therefrom, a follower gear movable longitudinally of said shaft but constrained to rotate therewith, and guide means movable with the follower gear and cooperative therewith to straddle a limited portion of the spiral track for causing the follower gear to be driven lengthwise of the output shaft by the track.

WILLIAM L. MAXSON.
PETER J. McLAREN.